United States Patent
Fukumitsu et al.

(10) Patent No.: US 11,285,560 B2
(45) Date of Patent: Mar. 29, 2022

(54) WELDING TORCH

(71) Applicant: Panasonic Intellectual Property Management Co., Ltd., Osaka (JP)

(72) Inventors: Yoichi Fukumitsu, Hyogo (JP); Takashi Nagai, Hyogo (JP); Atsuhiro Kawamoto, Hyogo (JP); Kaito Matsui, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 585 days.

(21) Appl. No.: 16/328,298

(22) PCT Filed: Jun. 22, 2017

(86) PCT No.: PCT/JP2017/023011
§ 371 (c)(1),
(2) Date: Feb. 26, 2019

(87) PCT Pub. No.: WO2018/066183
PCT Pub. Date: Apr. 12, 2018

(65) Prior Publication Data
US 2019/0210138 A1    Jul. 11, 2019

(30) Foreign Application Priority Data
Oct. 3, 2016 (JP) .............................. JP2016-195521

(51) Int. Cl.
*B23K 9/28* (2006.01)
*H02K 5/20* (2006.01)
(Continued)

(52) U.S. Cl.
CPC .............. *B23K 9/285* (2013.01); *B23K 9/133* (2013.01); *B23K 9/29* (2013.01); *B23K 9/32* (2013.01);
(Continued)

(58) Field of Classification Search
CPC .......... B23K 9/133; B23K 9/285; B23K 9/29; B23K 9/32; H02K 5/08; H02K 5/20; H02K 9/19
(Continued)

(56) References Cited

U.S. PATENT DOCUMENTS

| | | | |
|---|---|---|---|
| 2007/0119840 A1 | 5/2007 | Flattinger et al. | |
| 2008/0061047 A1* | 3/2008 | Borowy | B23K 9/32 219/130.1 |
| 2014/0097166 A1 | 4/2014 | Flattinger et al. | |

FOREIGN PATENT DOCUMENTS

| | | |
|---|---|---|
| JP | 6-086506 | 3/1994 |
| JP | 2007-520354 | 7/2007 |

(Continued)

OTHER PUBLICATIONS

Examination Report dated Jul. 13, 2020 in corresponding Indian Patent Application No. 201947009682, with English Translation.
(Continued)

*Primary Examiner* — Dana Ross
*Assistant Examiner* — James F Sims, III
(74) *Attorney, Agent, or Firm* — Wenderoth, Lind & Ponack, L.L.P.

(57) ABSTRACT

To provide a compact welding torch in which a motor can be easily replaced, in which, when a motor capable of high-speed welding is used for a long time in a high current region, heat generated by the motor can be sufficiently cooled, and in which the motor can be protected from spatters or the like.
A first cooler that cools a first side surface of a motor parallel to a shaft of the motor and a second cooler that cools a second side surface of the motor different from the first side surface are included. The first cooler has a first inflow port and a first outflow port for a cooling fluid, and a first flow passage that connects the first inflow port and the first (Continued)

outflow port. The second cooler has a second inflow port and a second outflow port for the cooling fluid, and a second flow passage that connects the second inflow port and the second outflow port. The first outflow port and the second inflow port open in a direction crossing the shaft of the motor and are connected to each other directly or indirectly.

6 Claims, 7 Drawing Sheets

(51) Int. Cl.
  *B23K 9/133* (2006.01)
  *B23K 9/29* (2006.01)
  *B23K 9/32* (2006.01)
  *H02K 9/19* (2006.01)
  *H02K 5/08* (2006.01)
(52) U.S. Cl.
  CPC ............... *H02K 5/20* (2013.01); *H02K 9/19* (2013.01); *H02K 5/08* (2013.01)

(58) Field of Classification Search
  USPC .................................................. 219/137.62
  See application file for complete search history.

(56) References Cited

FOREIGN PATENT DOCUMENTS

| | | |
|---|---|---|
| JP | 2013-042661 | 2/2013 |
| JP | 2016-129465 | 7/2016 |
| KR | 10-2007-0069401 | 7/2007 |

OTHER PUBLICATIONS

International Search Report of PCT application No. PCT/JP2017/023011 dated Sep. 12, 2017.

* cited by examiner

WELDING TORCH

CROSS-REFERENCE TO RELATED APPLICATIONS

This application is a U.S. national stage application of the PCT International Application No. PCT/JP2017/023011 filed on Jun. 22, 2017, which claims the benefit of foreign priority of Japanese patent application No. 2016-195521 filed on Oct. 3, 2016, the contents all of which are incorporated herein by reference.

TECHNICAL FIELD

The present disclosure relates to a welding torch, and particularly relates to a welding torch in which a wire feeding motor is incorporated.

BACKGROUND ART

As described in PTL 1, in a conventional welding torch in which a wire feeding motor is incorporated, a driving unit for feeding a welding wire is disposed within a torch housing. The driving unit is formed with at least a pair of driving roller, a pressing roller, and a motor. A part of the torch housing is a component of the driving unit.

Moreover, in order to stabilize and position a rotor, a motor shaft of the driving motor is mounted on the torch housing via bearings. In a welding wire feeding and driving motor including the bearings, the rotor, and particularly the motor shaft, at least a part of the motor shaft, particularly a holding section of the driving motor, is electrically insulated from a stator housing or a base body.

CITATION LIST

Patent Literature

PTL 1: Japanese Translation of PCT International Application Publication No. 2007-520354

SUMMARY OF THE INVENTION

Technical Problems

In PTL 1, the base body also serves as a housing of the motor. The bearings which support a shaft of a wire feeding side motor for positioning the rotor can be mounted on the torch housing. Accordingly, a fabrication tolerance between a position of the motor shaft and a welding wire feeding shaft decreases.

However, since a winding pack of the motor, particularly a stator winding, is directly installed in the torch housing, particularly in the base body, it is difficult to replace the motor. Further, considering cooling of the motor, cooling efficiency is deteriorated if the motor is cooled from outside the torch housing. Also, if the motor is cooled inside the torch housing, the torch housing is enlarged and is inconvenient to handle.

In order to solve the above conventional problems, an object of the present invention is to provide a welding torch which facilitates replacement of a motor and is excellent in cooling performance of the motor.

Solution to Problems

In order to solve the above conventional problems, a welding torch of the present invention includes: a feed unit including a motor for feeding a wire; and a motor holder provided that covers the motor. The motor holder includes a first cooler that cools a first side surface of the motor parallel to a shaft of the motor and a second cooler that cools a second side surface of the motor different from the first side surface. The first cooler has a first inflow port and a first outflow port for a cooling fluid, and a first flow passage that connects the first inflow port and the first outflow port. The second cooler has a second inflow port and a second outflow port for a cooling fluid, and a second flow passage that connects the second inflow port and the second outflow port. The first outflow port and the second inflow port open in a direction crossing the shaft of the motor and are connected to each other directly or indirectly.

The first cooler and the second cooler can cover the motor so as to sandwich the motor from both the side surfaces, thereby facilitating replacement of the motor. Further, even if the motor requires larger cooling ability, this case can be easily coped with by changing a shape of each of the coolers. For example, even when a motor capable of high-speed welding is used for a long time in a high current range, heat generated by the motor can be sufficiently cooled.

Further, in the welding torch of the present invention, the first outflow port and the second inflow port may be connected by a tubular connecting tool. With this configuration, connection can be facilitated.

Further, in the welding torch of the present invention, the first outflow port is formed in a protruded shape that protrudes from a side surface of the first cooler, and the second inflow port is formed in a recessed shape recessed from a side surface of the second cooler. With this configuration, connection can be simplified only by fitting the protruded shape and the recessed shape to each other.

Further, the first outflow port and the second inflow port may be connected inside the first cooler and the second cooler. A connecting part can be protected from welding spatters or the like.

Further, in the welding torch of the present invention, the first cooler and the first side surface or the second cooler and the second side surface may be connected via a thermally conductive member. With this configuration, it is possible to cope with a motor having a different outer frame dimension, while improving thermal conduction performance.

Further, in the welding torch of the present invention, the first cooler and the second cooler may cover entire side surfaces including the first side surface and the second side surface and an entire back surface of the motor. With this configuration, the motor can be protected from welding spatters or the like.

Further, in the welding torch of the present invention, the first cooler or the second cooler may be fixed to a manipulator tip via a torch holder. With this configuration, the motor holder can be used as a component for offsetting the entire welding torch from the manipulator tip, and the compact welding torch can be provided.

Advantageous Effects of Invention

A welding torch of the present invention facilitates replacement of a motor and is excellent in cooling performance of the motor.

DESCRIPTION OF EMBODIMENT

Hereinafter, an exemplary embodiment of the present invention will be described with reference to the drawings.

Figure 1:
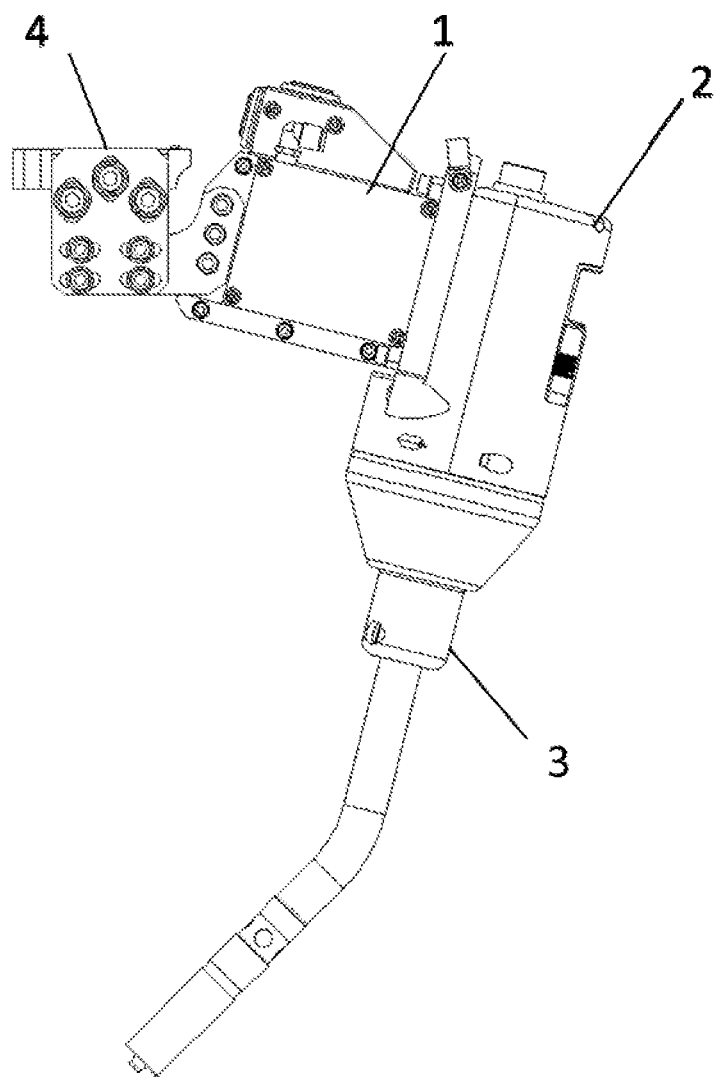
FIG. 1 is a general view of an entire welding torch according to a present exemplary embodiment.

FIG. 1 is a general view of an entire welding torch. The welding torch includes motor holder 1 for covering motor 5 (see FIGS. 5, 6, and 7) and feed unit 2 provided with a mechanism in which motor 5 feeds a welding wire (not illustrated) from a tip of torch body 3. Motor 5 is fixed to feed unit 2 via an insulating component. Motor holder 1 is connected to a manipulator tip (not illustrated) of a welding robot via torch holder 4.

Figure 2:
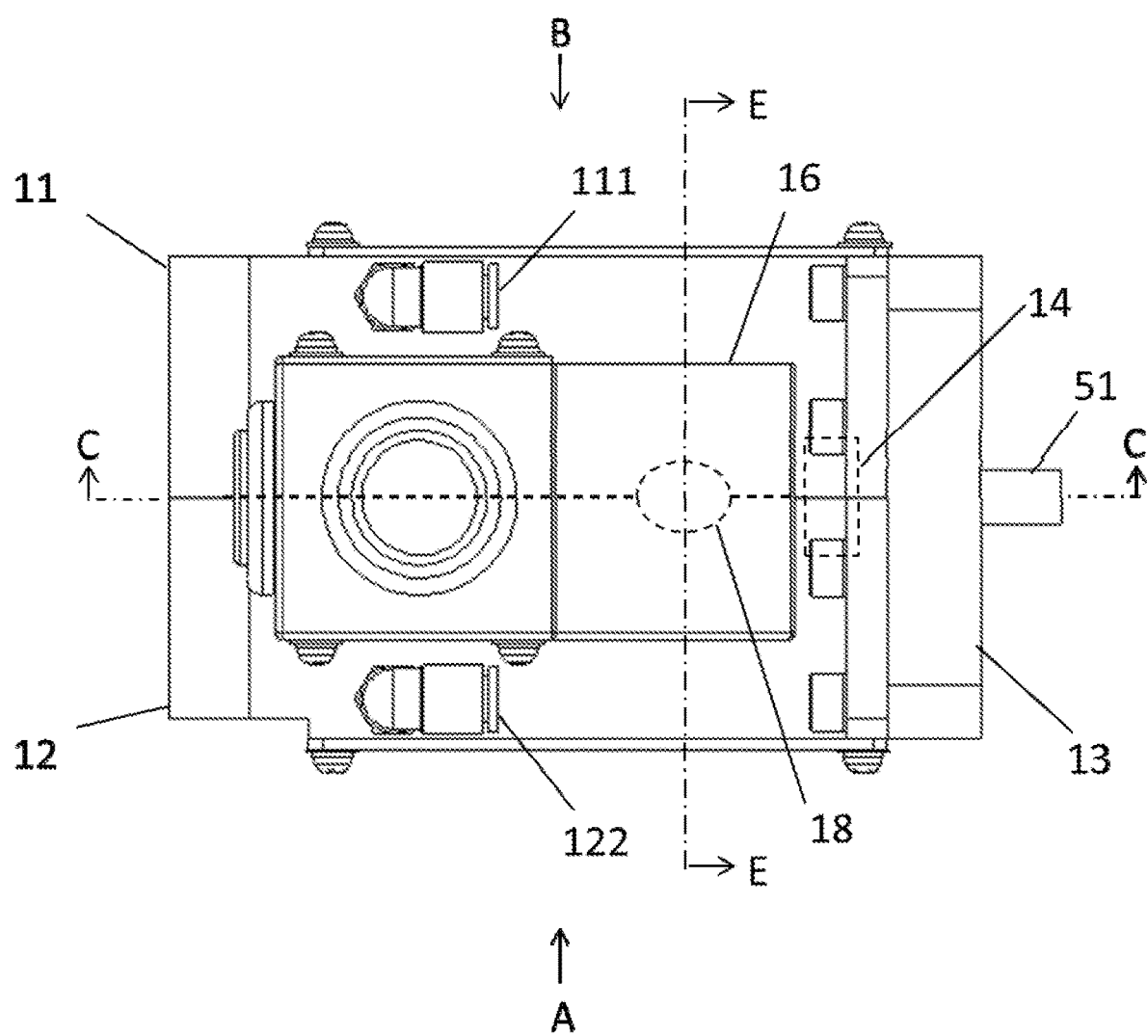
FIG. 2 is a top view of a motor holder of the welding torch according to the present exemplary embodiment.
Figure 3:
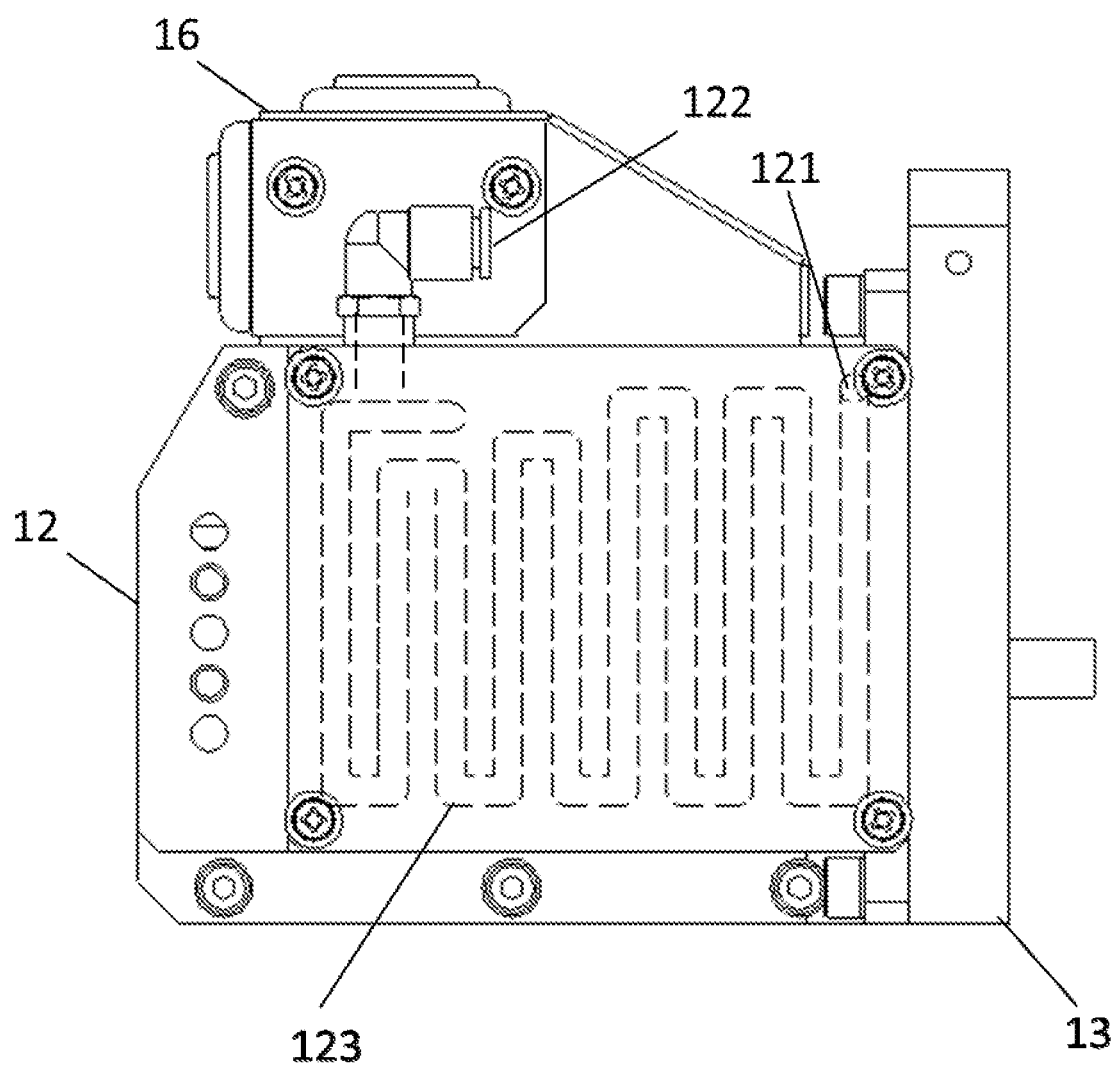
FIG. 3 is a side view (as viewed from arrow A in FIG. 2) of the motor holder of the welding torch according to the present exemplary embodiment.
Figure 4:
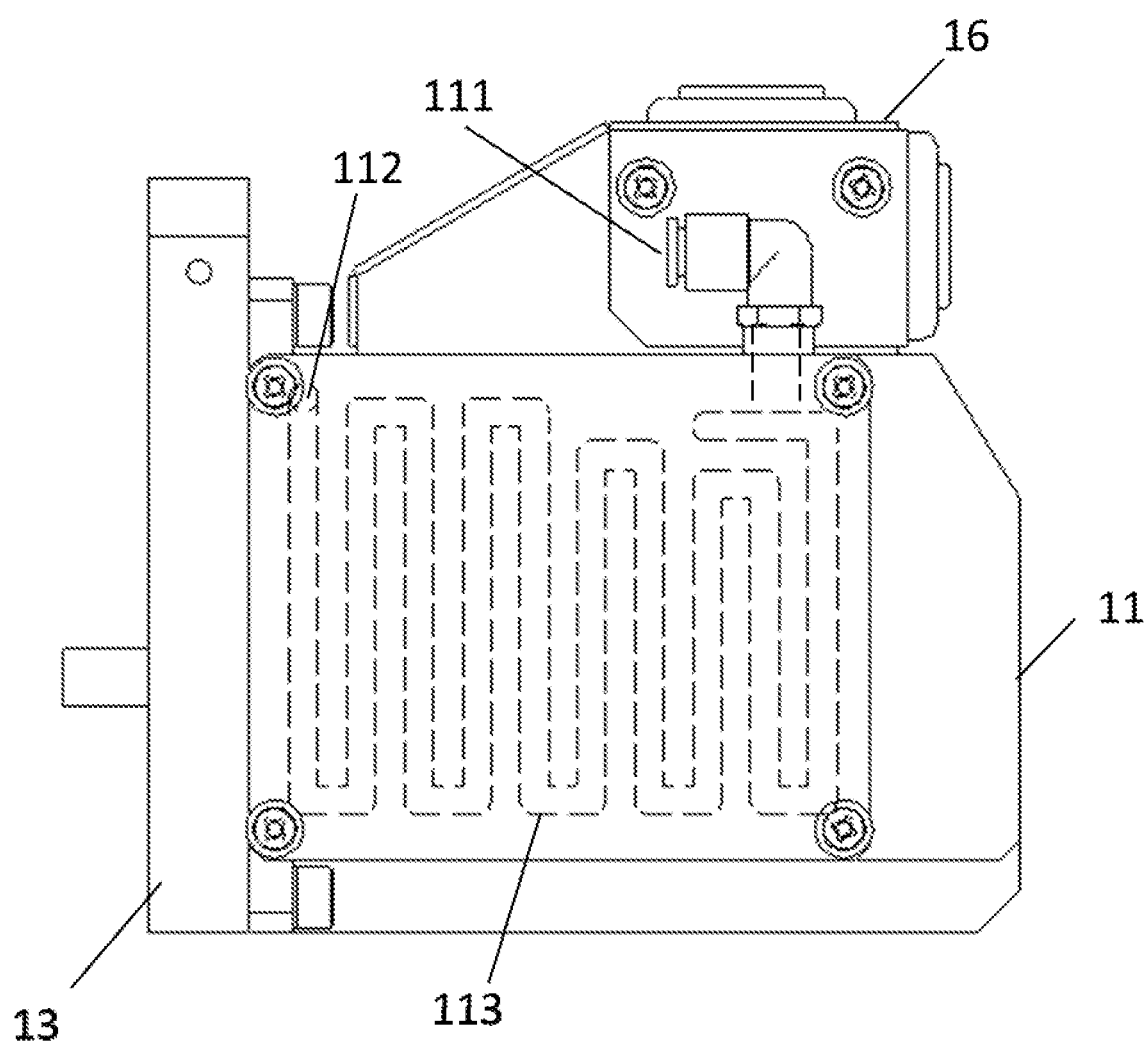
FIG. 4 is a side view (as viewed from arrow B in FIG. 2) of the motor holder of the welding torch according to the present exemplary embodiment.

FIG. 2 is a top view of motor holder 1 (including the motor) from which feed unit 2 and torch body 3 are detached. FIG. 3 is a side view (as viewed from arrow A in FIG. 2) of motor holder 1, and FIG. 4 is another side view (as viewed from arrow B in FIG. 2) of motor holder 1.

Motor holder 1 is provided with first cooler 11 having a flow passage in which a cooling fluid for cooling motor 5 flows and second cooler 12 having a similar flow passage. First cooler 11 and second cooler 12 sandwich motor 5 from both side surfaces. First cooler 11, second cooler 12, and motor flange 13 are configured to surround an outer frame of motor 5. Shaft 51 of motor 5 protrudes from motor flange 13. Note that the cooling fluid is not particularly specified and may be gas or liquid.

Figure 5:
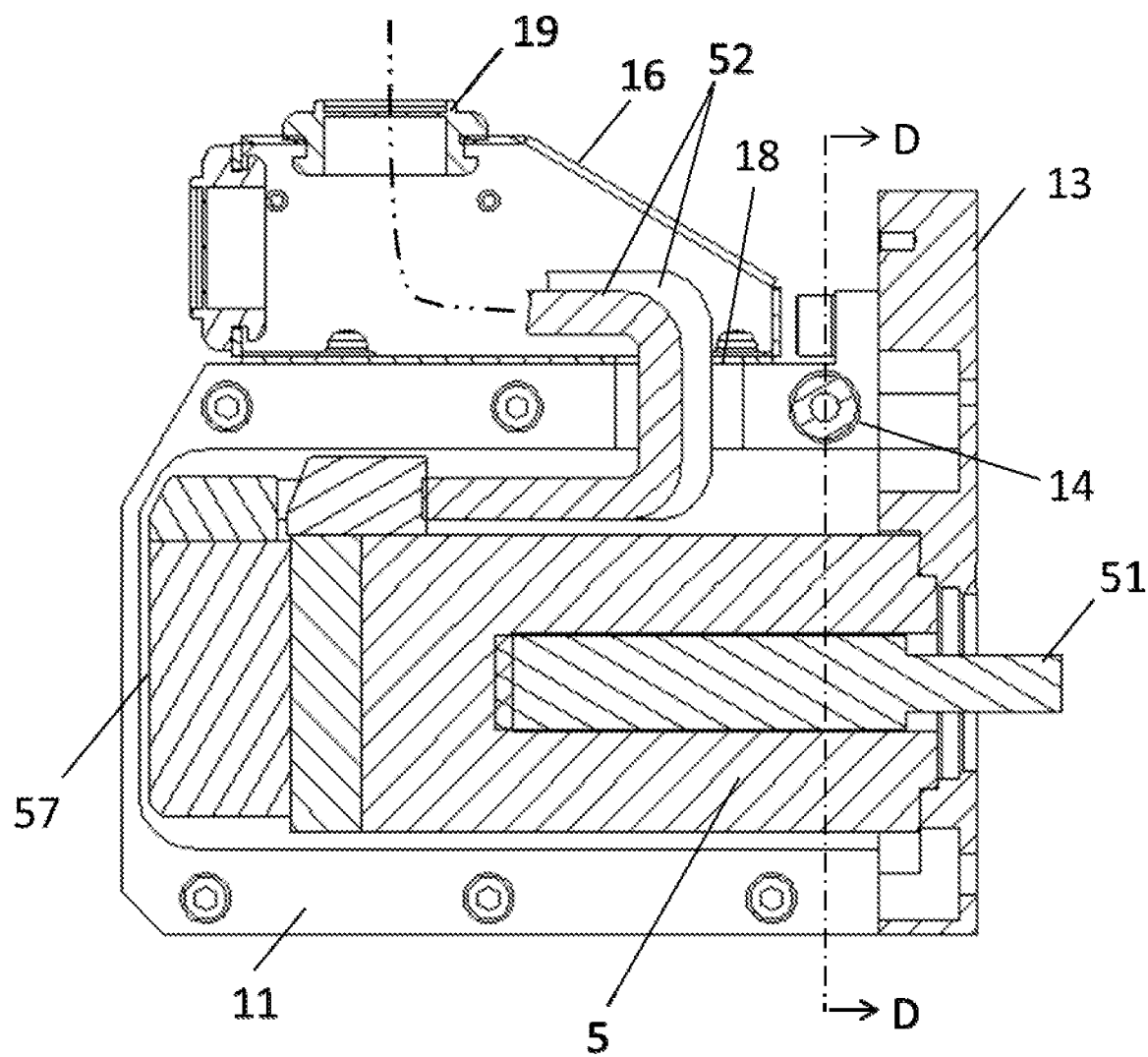
FIG. 5 is a sectional view taken along line C-C in FIG. 2.
Figure 6:
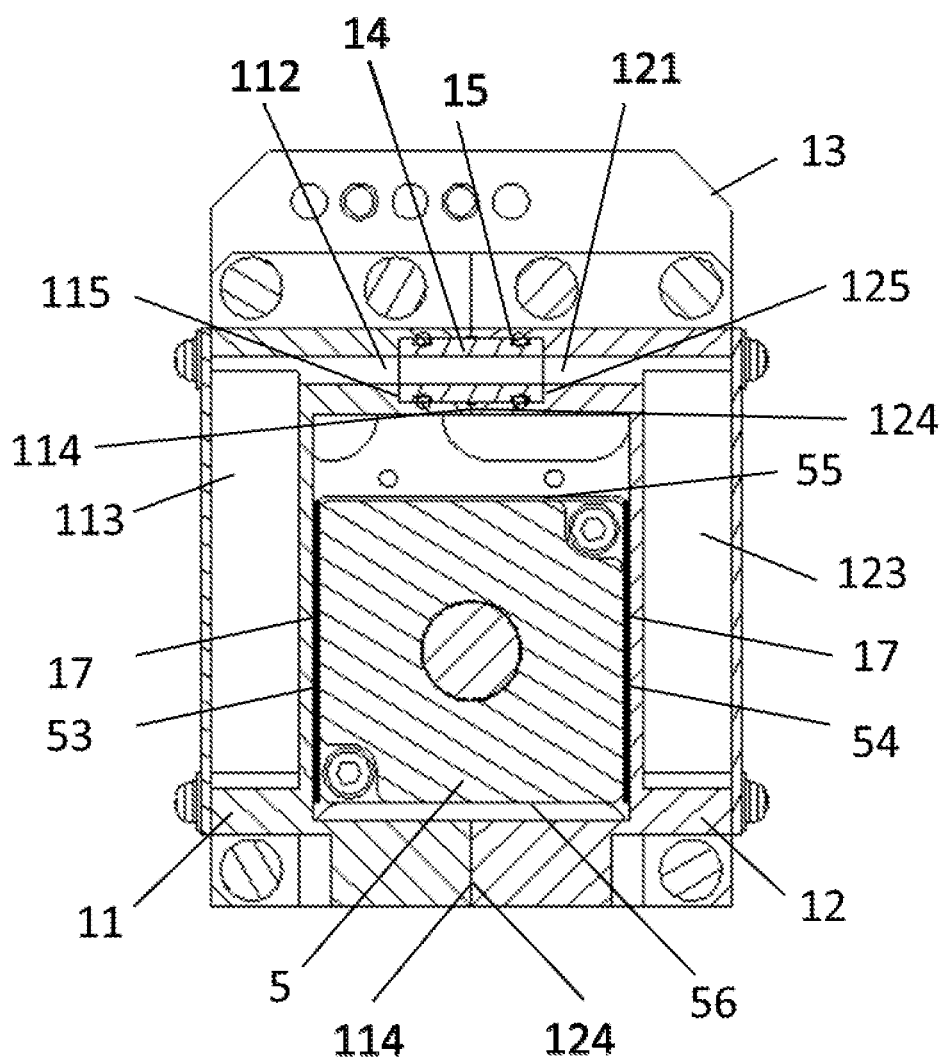
FIG. 6 is a sectional view taken along line D-D in FIG. 5.

Next, the two coolers will be described in detail also with reference to FIGS. 5 and 6. FIG. 5 is a section taken along line C-C in FIG. 2, and FIG. 6 is a section taken along line D-D in FIG. 5.

First cooler 11 cools left side surface 53 (first side surface) of motor 5 parallel to an axial direction of motor 5. Second cooler 12 cools right side surface 54 (second side surface) of motor 5 parallel to the axial direction of motor 5. The axial direction is a direction along shaft 51 of motor 5. First cooler 11 covers entire left side surface 53, a left half of upper side surface 55, a left half of lower side surface 56, and a left half of back surface 57 of motor 5. Second cooler 12 covers entire right side surface 54, a right half of upper side surface 55, a right half of lower side surface 56, and a right half of back surface 57 of motor 5. First cooler 11 and second cooler 12 are coupled to each other by bolts and nuts in a state in which respective mating surfaces 114, 124 are in contact. Motor holder 1 assembled by first cooler 11 and second cooler 12 covers entire side surfaces (left side surface 53, right side surface 54, upper side surface 55, lower side surface 56) and entire back surface 57 of motor 5.

First cooler 11 is provided, at an upper part, with first inflow port 111 (see FIG. 4) serving as an inlet for the cooling fluid from outside. This first inflow port 111 is connected with first flow passage 113 provided inside first cooler 11. First flow passage 113 is connected to first outflow port 112 (see FIGS. 4 and 6) serving as an outlet for the cooling fluid from first cooler 11. First outflow port 112 opens in a direction crossing the axial direction of motor 5.

Herein, for example, a base material of first cooler 11 is formed of aluminum, a groove is cut from one side surface of first cooler 11, and the entire groove is covered with and closed by a plate material. Thus, first flow passage 113 can be easily produced.

Second cooler 12 is provided with second inflow port 121 (see FIGS. 3 and 6) serving as an inlet for the cooling fluid from first cooler 11. This second inflow port 121 is connected with second flow passage 123 provided inside second cooler 12. Second flow passage 123 is connected to second outflow port 122 (see FIG. 3) serving as an outlet for the cooling fluid from second cooler 12 to the outside. Second inflow port 121 opens in the direction crossing the axial direction of motor 5.

First outflow port 112 and second inflow port 121 are connected by tubular connecting tool 14 having a tube axis along the direction crossing the axial direction of motor 5. Mating surface 114 of first cooler 11 has recess 115 connected to first outflow port 112. Mating surface 124 of second cooler 12 has recess 125 connected to second inflow port 121. Connecting tool 14 is fitted into recesses 115, 125 of first cooler 11 and second cooler 12, respectively, via O-ring 15. Even without using connecting tool 14, a first outflow port formed in a protruded shape that protrudes from a side surface of first cooler 11 (for example, mating surface 114 of first cooler 11) and a second inflow port formed in a recessed shape recessed from a side surface of second cooler 12 (for example, mating surface 124 of second cooler 12) may be connected by fitting the first outflow port and the second inflow port each other. In this case, a configuration is simpler, and reliability is improved.

Note that, as in above-described connecting tool 14 or fitting of the recess and the protrusion, it is preferable that first outflow port 112 and second inflow port 121 be connected inside first cooler 11 and second cooler 12. In other words, it is preferable to have a configuration in which first outflow port 112 and second inflow port 121 are not exposed to the outside. A connecting part can be protected from dust or the like from the outside. Especially, the connecting part can be protected from welding spatters or the like.

Figure 7:
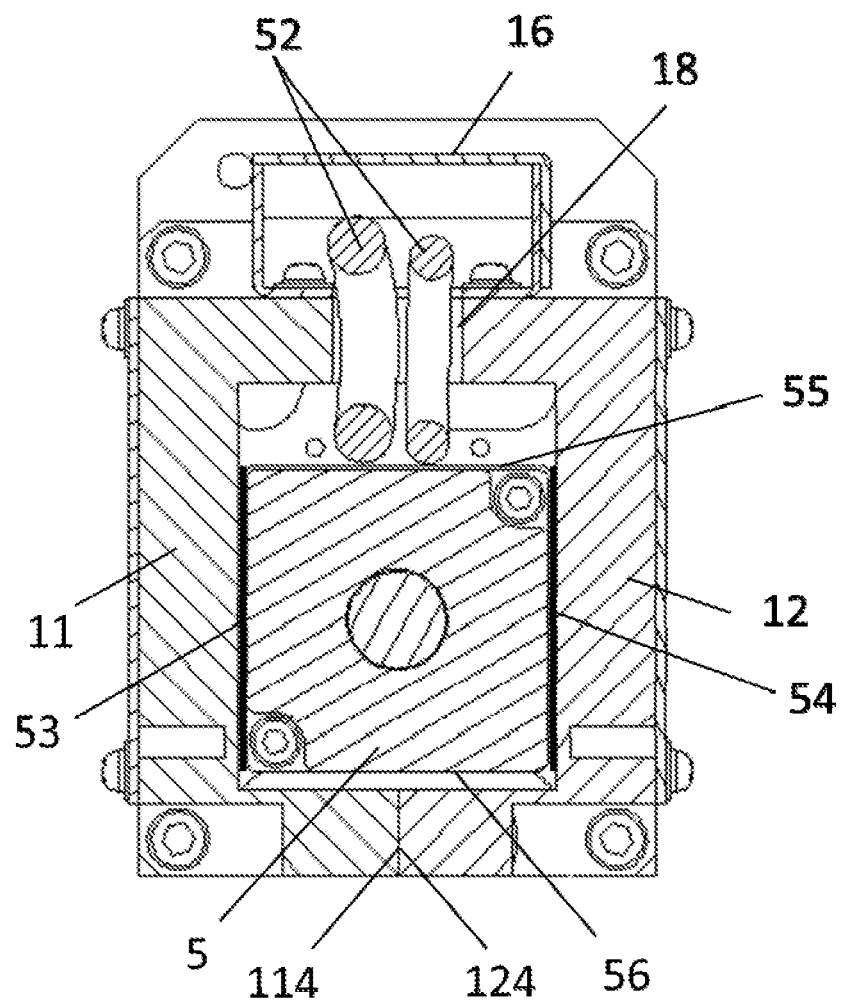
FIG. 7 is a sectional view taken along line E-E in FIG. 2.

FIG. 7 is a section taken along line E-E in FIG. 2. Wiring opening 18 serving as an outlet for wiring lines 52 of motor 5 is provided at a part of mating surfaces 114, 124 of first cooler 11 and second cooler 12. Wiring cover 16 is provided so as to cover wiring opening 18. As illustrated by a two-dot chain line in FIG. 5, wiring lines 52 are led to the outside through wiring hole cap 19 provided at wiring cover 16. Wiring lines 52 led to the outside are connected to a robot control device.

As described above, except shaft 51, motor 5 is covered with motor flange 13, first cooler 11, second cooler 12, and wiring cover 16. As a result, motor 5 can be protected from dust or the like from the outside, and particularly from welding spatters or the like. Note that it is preferable to use wiring cover 16, but the effect can be exerted even without wiring cover 16.

Further, as illustrated in FIGS. 6 and 7, thermally conductive elastic sheet 17 serving as a thermally conductive member is sandwiched between first cooler 11 and left side surface 53 of motor 5 and between second cooler 12 and right side surface 54 of motor 5. As a result, adhesion between each of the coolers and motor 5 is enhanced, and a cooling effect is improved. By changing a thickness of elastic sheet 17, it is also possible to cope with a case where another motor with a different outer shape is employed.

Silicone rubber, acrylic rubber, or the like can be used for elastic sheet 17. However, a material for elastic sheet 17 is not limited to silicone rubber, acrylic rubber, or the like, and may be thermally conductive grease such as silicone. Further, elastic sheet 17 may be provided at least either one of between first cooler 11 and left side surface 53 of motor 5 and between second cooler 12 and right side surface 54 of motor 5.

Further, as illustrated in FIG. 1, one end of torch holder 4 is fixed to second cooler 12 of motor holder 1 on anti-motor flange 13 side, and another end of torch holder 4 is fixed to a place close to the manipulator tip. As a result, motor holder 1 can be used as a component for offsetting an entire welding torch from the manipulator tip, torch holder 4 can have a smaller outer shape, and a compact welding torch can be provided for a robot. One end of torch holder 4 may be fixed to first cooler 11 instead of second cooler 12 or together with second cooler 12.

INDUSTRIAL APPLICABILITY

As described above, a welding torch of the present invention is applicable to a welding robot or the like which automatically performs welding by mounting the welding torch to a manipulator tip.

REFERENCE MARKS IN THE DRAWINGS 1 motor holder
2 feed unit
3 torch body
4 torch holder
5 motor
11 first cooler
12 second cooler
13 motor flange
14 connecting tool
15 O-ring
16 wiring cover
17 elastic sheet
18 wiring opening
19 wiring hole cap
51 shaft
52 wiring line
53 left side surface
54 right side surface
55 upper side surface
56 lower side surface
57 back surface
111 first inflow port
112 first outflow port
113 first flow passage
114 mating surface
115 recess
121 second inflow port
122 second outflow port
123 second flow passage
124 mating surface
125 recess

The invention claimed is:

1. A welding torch comprising:
a feed unit including a motor for feeding a wire; and
a motor holder that covers the motor, wherein
the motor includes a first side surface, a second side surface, a third side surface, and a fourth side surface, the third side surface connecting the first side surface and the second side surface, the fourth side surface connecting the first side surface and the second side surface, and the first side surface, the second side surface, the third side surface, and the fourth side surface are parallel to a shaft of the motor, respectively,
the motor further includes a back surface connecting to the first side surface, the second side surface, the third side surface, and the fourth side surface,
the motor holder includes a first cooler that cools a first side surface and a second cooler that cools the second side surface,
the first cooler has a first inflow port and a first outflow port for a cooling fluid, and a first flow passage that connects the first inflow port and the first outflow port, the first cooler covering the entire first side surface, approximately half of the third side surface that is closer to the first side surface, approximately half of the fourth side surface that is closer to the first side surface, and approximately half of the back surface that is closer to the first side surface,
the second cooler has a second inflow port and a second outflow port for the cooling fluid, and a second flow passage that connects the second inflow port and the second outflow port, the second cooler covering the entire second side surface, approximately half of the third side surface that is closer to the second side surface, approximately half of the second side surface that is closer to the first side surface, and approximately half of the back surface that is closer to the first side surface,
the first cooler and the second cooler are connected in a state in which respective mating surfaces of the first cooler and the second cooler are in contact with each other,
entire side surfaces including the first side surface, the second side surface, the third side surface, and the fourth side surface, and the entire back surface are covered by sandwiching the motor between the first cooler and the second cooler,
the first outflow port and the second inflow port open in a direction crossing the shaft of the motor and are connected to each other directly or indirectly in the direction crossing the shaft of the motor, and
the cooling fluid flows from the first inflow port to the second outflow port via the first flow passage, the first outflow port, the second inflow port, and the second flow passage in this order.

2. The welding torch according to claim 1, wherein the first outflow port and the second inflow port are connected by a tubular connecting tool.

3. The welding torch according to claim 1, wherein the first outflow port is formed in a protruded shape that protrudes from a side surface of the first cooler, and the second inflow port is formed in a recessed shape recessed from a side surface of the second cooler.

4. The welding torch according to claim 1, wherein the first outflow port and the second inflow port are connected inside the first cooler and the second cooler.

5. The welding torch according to claim 1, wherein the first cooler and the first side surface or the second cooler and the second side surface are connected via a thermally conductive member.

6. The welding torch according to claim 1, wherein the first cooler or the second cooler is fixed to a manipulator tip via a torch holder.

* * * * *